United States Patent
Yazdi et al.

(10) Patent No.: US 6,402,968 B1
(45) Date of Patent: Jun. 11, 2002

(54) MICROELECTROMECHANICAL CAPACITIVE ACCELEROMETER AND METHOD OF MAKING SAME

(76) Inventors: Navid Yazdi, 2221 Hubbard St., Apt. #3, Ann Arbor, MI (US) 48105; Khalil Najafi, 3207 Middleton Dr., Ann Arbor, MI (US) 48105

( * ) Notice: Subject to any disclaimer, the term of this patent is extended or adjusted under 35 U.S.C. 154(b) by 0 days.

(21) Appl. No.: 09/482,402

(22) Filed: Jan. 12, 2000

Related U.S. Application Data

(62) Division of application No. 08/925,257, filed on Sep. 8, 1997, now Pat. No. 6,035,714.

(51) Int. Cl.[7] .......................................... G01P 15/125
(52) U.S. Cl. ............................................. 216/2; 216/39
(58) Field of Search .................... 216/2, 39; 73/514.17, 73/514.18, 514.32, 514.38; 361/283.3, 280, 281

(56) References Cited

U.S. PATENT DOCUMENTS

| | | | |
|---|---|---|---|
| 4,483,194 A | 11/1984 | Rufolf | 73/517 R |
| 4,598,585 A | 7/1986 | Boxenhorn | 73/505 |
| 4,922,756 A | 5/1990 | Henrion | 73/517 R |
| 5,000,817 A | 3/1991 | Aine | 156/633 |
| 5,006,487 A | 4/1991 | Stokes | 437/228 |

(List continued on next page.)

OTHER PUBLICATIONS

"Advanced Micromachined Condenser Hydrophone", J. Bernstein and M. Weinberg, Solid State Sensor and Actuator Workshop, Hilton Head, SC, Jun. 13–16, 1994, pp. 73–77.

"High Density Vertical Comb Array Microactuators Fabricated Using a Novel Bulk/Poly–Silicon Trench Refill Technology", Arjun Selvakumar and Khalil Najafi, Solid–State Sensor & Actuator Workshop 6/94, pp. 138–141.

(List continued on next page.)

*Primary Examiner*—Anita Alanko
(74) *Attorney, Agent, or Firm*—Brooks & Kushman P.C.

(57) ABSTRACT

A high sensitivity, Z-axis capacitive microaccelerometer having stiff sense/feedback electrodes and a method of its manufacture are provided. The microaccelerometer is manufactured out of a single silicon wafer and has a silicon-wafer-thick proofmass, small and controllable damping, large capacitance variation and can be operated in a force-rebalanced control loop. The multiple stiffened electrodes have embedded therein damping holes to facilitate both force-rebalanced operation of the device and controlling of the damping factor. Using the whole silicon wafer to form the thick large proofmass and using the thin sacrificial layer to form a narrow uniform capacitor air gap over a large area provide large capacitance sensitivity. The structure of the microaccelerometer is symmetric and thus results in low cross-axis sensitivity. In one embodiment, because of its all-silicon structure, the accelerometer exhibits very low temperature sensitivity and good long term stability. The manufacturing process is simple and thus results in low cost and high yield manufacturing. In the one embodiment, the electrodes are formed by thin polysilicon deposition with embedded vertical stiffeners. The vertical stiffeners are formed by refilling vertical trenches in the proofmass and are used to make the electrodes stiff in the sense direction (i.e. Z or input axis). In a second embodiment, the electrodes are metallized and dimensioned so as to be stiff in the sense direction.

5 Claims, 5 Drawing Sheets

U.S. PATENT DOCUMENTS

| | | | |
|---|---|---|---|
| 5,146,435 A | 9/1992 | Bernstein | 367/181 |
| 5,216,490 A | 6/1993 | Greiff et al. | 73/517 R |
| 5,345,824 A | 9/1994 | Sherman et al. | 73/517 R |
| 5,350,189 A | 9/1994 | Tsuchitani et al. | 280/728 R |
| 5,392,651 A | 2/1995 | Suzuki et al. | 73/517 R |
| 5,404,749 A | 4/1995 | Spangler | 73/517 R |
| 5,427,975 A | 6/1995 | Sparks et al. | 437/79 |
| 5,445,006 A | 8/1995 | Allen et al. | 73/1 D |
| 5,461,917 A | 10/1995 | Marek et al. | 73/514.16 |
| 5,503,285 A | 4/1996 | Warren | 216/2 |
| 5,535,626 A | 7/1996 | Bullis et al. | 73/514.32 |
| 5,540,095 A | 7/1996 | Sherman et al. | 73/514.18 |
| 5,559,290 A | 9/1996 | Suzuki et al. | 73/514.36 |
| 5,561,248 A | 10/1996 | Negoro | 73/514.32 |
| 5,563,343 A | 10/1996 | Shaw et al. | 73/514.18 |
| 5,573,679 A | 11/1996 | Mitchell et al. | 216/2 |
| 5,594,171 A | 1/1997 | Ishida et al. | 73/514.32 |
| 5,605,598 A | 2/1997 | Greiff | 156/630.1 |
| 5,616,844 A | 4/1997 | Suzuki et al. | 73/514.32 |
| 5,665,915 A | 9/1997 | Kobayashi et al. | 73/514.32 |
| 5,719,069 A | 2/1998 | Sparks | 437/59 |
| 5,719,336 A | 2/1998 | Ando et al. | 73/514.32 |
| 5,750,420 A * | 5/1998 | Bono et al. | 438/52 |
| 5,830,777 A | 11/1998 | Ishida et al. | 438/50 |
| 6,122,963 A * | 9/2000 | Hammond et al. | 361/280 |
| 6,215,645 B1 * | 4/2001 | Li et al. | 361/283.3 |

OTHER PUBLICATIONS

"Single–and Multi–layer Electroplated Microaccelerometers", Yoshihiro Konaka & Mark G. Allen, o– 1996 IEEE, pp. 168–173. MEMS '96.

"A Micromachined Condenser Hydrophone", J. Bernstein, 1992 IEEE, pp. 161–165, $5^{th}$Technical Digest.

"Silicon Monolithic Micromechanical Gyroscope", P. Greiff, B. Boxenhorn, T. King & L. Niles; 1991 IEEE, pp. 966–968, Solid–State Sensors & Actuators, Transducers '91.

"An All–Silicon Single–Wafer Fabrication Technology for Precision Microaccelerometers", Navid Yazdi & Khalil Najafi, Transducers '97, 1997, International Conference on vol. 2, pp. 1181–1184.

"Surface Micromachined Accelerometers", Bernard Boser, Roger Howe, IEEE 1995 Custom Integrated Circuits Conference, pp. 337–344.

"An Inertial–Grade, Micromachined Vibrating Beam Accelerometer", Terry Roszhart, Hal Jerman, Joe Drake & Constant deCotiis, Transducers '95, the 8th International Conf. vol. 2 pp. 656–658, Solid–State Sensors & Actuators, 6/95.

"Wide Dynamic Range Direct Digital Accelerometer", Widge Henrion, Len DiSanza, Matthew Ip, Stephen Terry & Hal Jerman, 1990 IEEE, pp. 153–157.

"Design and Test of a Precision Servaccelerometer with Digital Output", Y. deCoulon, T. Smith, J. Hermann, M. Chevroulet, F. Rudolf, 7th International Conference on Solid–State Sensors & Actuators pp. 832–835, 1984.

"Silicon Microaccelerometer", Felix Rudolf, Alain Joinod, Philip Pzencze, Transducers '87, pp. 395–398.

* cited by examiner

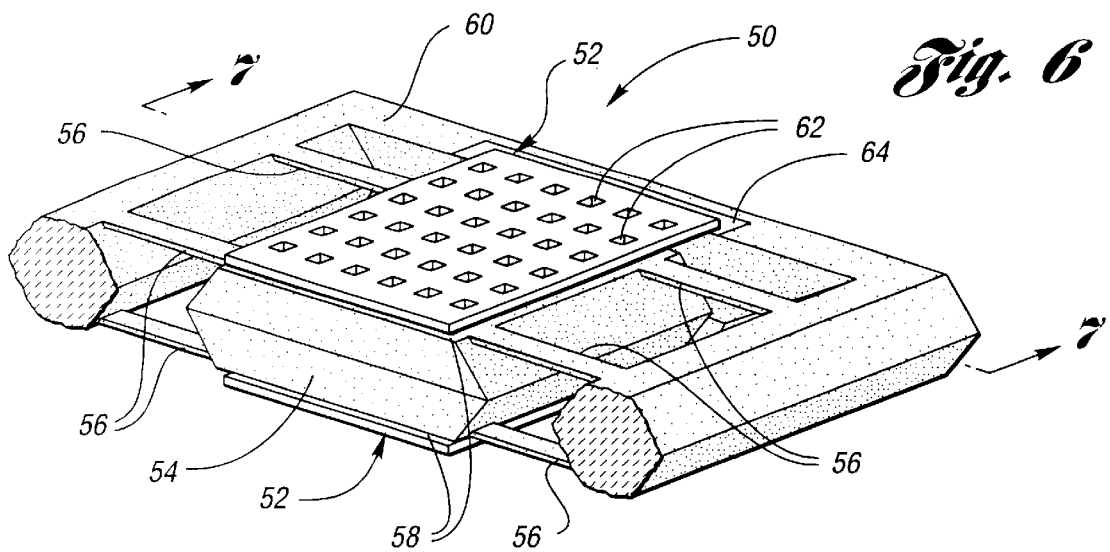
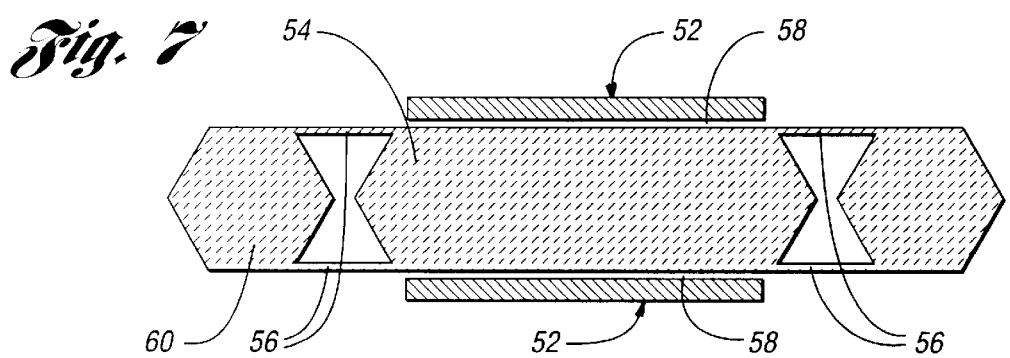
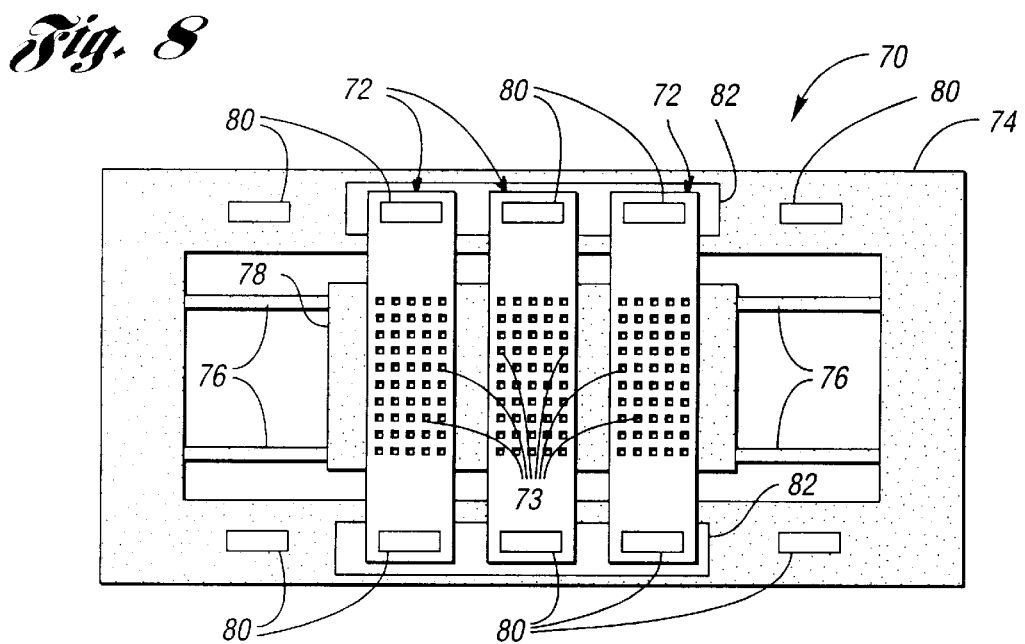

MICROELECTROMECHANICAL CAPACITIVE ACCELEROMETER AND METHOD OF MAKING SAME

This is divisional of application(s) Ser. No. 08/925,257 filed on Sep. 8, 1997 now U.S. Pat. No. 6,035,714.

GOVERNMENT RIGHTS

This invention was made with government support under Contract No. DABT63-95-C-0111, awarded by the Defense Advanced Research Projects Agency (DARPA). The government has certain rights in the invention.

TECHNICAL FIELD

This invention relates to capacitive accelerometers and, in particular, to microelectromechanical capacitive accelerometers and methods of making same.

BACKGROUND ART

Accelerometers are required in numerous applications, such as navigation, guidance, microgravity measurements, seismology and platform stabilization. Also, as they become manufacturable at low cost with small size, they attain a large potential consumer market in their application as a GPS-aid to obtain position information when the GPS receivers lose their line-of-sight with the satellites.

Some accelerometers are fabricated by surface micromachining or bulk micromachining. The surface micromachined devices are fabricated on a single silicon wafer. However, they generally have low sensitivity and large noise floor, and thus cannot satisfy requirements of many precision applications.

Some high resolution accelerometers are bulk micromachined and use multiple wafer bonding as part of their manufacturing process. This wafer bonding is a complex fabrication step, and hence results in lower yield and higher cost. Also, forming damping holes in the thick bonded wafers is difficult, and thus special packaging at a specified ambient pressure is typically needed to control the device damping factor. Finally, due to wafer bonding, these devices show higher temperature sensitivity and larger drift.

U.S. Pat. No. 5,345,824 discusses a monolithic capacitive accelerometer with its signal conditioning circuit fabricated using polysilicon proofmass and surface micromachining.

U.S. Pat. No. 5,404,749 discusses a boron-doped silicon accelerometer sensing element suspended between two conductive layers deposited on two supporting dielectric layers.

U.S. Pat. No. 5,445,006 discusses a self-testable microaccelerometer with a capacitive element for applying a test signal and piezoresistive sense elements.

U.S. Pat. No. 5,461,917 discusses a silicon accelerometer made of three silicon plates.

U.S. Pat. No. 5,503,285 discusses a method for forming an electrostatically force rebalanced capacitive silicon accelerometer. The method uses oxygen implantation of the proofmass to form a buried oxide layer and bonding of two complementary proofmass layers together. The implanted oxide layer is removed after bonding to form an air gap and release the proofmass.

U.S. Pat. No. 5,535,626 discusses a capacitive microsensor formed of three silicon layers bonded together. There is glass layer used between each two bonded silicon pairs.

U.S. Pat. No. 5,540,095 discusses a monolithic capacitive accelerometer integrated with its signal conditioning circuitry. The sensor comprises two differential sense capacitors.

U.S. Pat. No. 5,559,290 discusses a capacitive accelerometer formed of three silicon plates, attached together using a thermal oxide interface.

U.S. Pat. No. 5,563,343 discusses a lateral accelerometer fabricated of a single crystal silicon wafer.

U.S. Pat. No. 5,605,598 discloses a monolithic micromechanical vibrating beam accelerometer having a trimmable resonant frequency and method of making same.

The paper entitled "Advanced Micromachined Condenser Hydrophone" by J. Bernstein et al, Solid-State Sensor and Actuator Workshop, Hilton Head, S.C., June, 1994, discloses a small micromechanical hydrophone having capacitor detection. The hydrophone includes a fluid-filled variable capacitor fabricated on a monolithic silicon chip.

The paper entitled "High Density Vertical Comb Array Microactuators Fabricated Using a Novel Bulk/Poly-Silicon Trench Refill Technology", by A. Selvakumar et al., Hilton Head, S.C., June 1994, discloses a fabrication technology which combines bulk and surface micromachining techniques. Trenches are etched and then completely refilled.

Numerous U.S. patents disclose electroplated microsensors such as U.S. Pat. Nos. 5,216,490; 5,595,940; 5,573,679; and 4,598,585.

Numerous U.S. patents disclose accelerometers such as U.S. Pat. Nos. 4,483,194 and 4,922,756.

U.S. Pat. No. 5,146,435 discloses an acoustic transducer including a perforated plate, a movable capacitor plate and a spring mechanism, all of which form a uniform monolithic structure from a silicon wafer.

SUMMARY OF THE INVENTION

An object of the present invention is to provide a microelectromechanical capacitive accelerometer wherein at least one of its conductive electrodes includes a layer which is stiff but thin relative to a proofmass of the accelerometer.

Another object of the present invention is to provide a microelectromechanical capacitive accelerometer formed from a single semiconductor wafer with a proofmass having a thickness substantially equal to the thickness of the wafer, controllable/small damping and large capacitance variation.

Yet another object of the present invention is to provide a microelectromechanical capacitive accelerometer having at least one conductive electrode formed as a stiffened film or layer which is thin by at least one order of magnitude relative to the thickness of a proofmass of the accelerometer.

Yet still another object of the present invention is to provide a low cost method for making a microelectromechanical capacitive accelerometer wherein at least one resulting conductive electrode is relatively thin but stiff and the resulting proofmass is relatively thick so as to provide high sensitivity in the capacitive accelerometer.

In carrying out the above objects and other objects of the present invention, a microelectromechanical capacitive accelerometer having an input axis is provided. The accelerometer includes at least one conductive electrode including a planar layer which is relatively thin along the input axis. The at least one conductive electrode is stiff so as to resist bending movement along the input axis. The accelerometer also includes a proofmass which is thicker than the planar layer by at least one order of magnitude along the input axis and a support structure for supporting the proofmass in spaced relationship from the at least one conductive electrode. The at least one conductive electrode and the proofmass have a substantially uniform narrow air gap therebetween. The conductive electrode and the proofmass form an acceleration-sensitive capacitor.

Preferably, the at least one electrode is sufficiently stiff to force-balance proof-mass displacement due to acceleration along the input axis without substantial bending of the at least one conductive electrode along the input axis.

Also, preferably, the proofmass is formed from a single silicon wafer having a predetermined thickness and wherein the thickness of the proofmass is substantially equal to the predetermined thickness.

In one embodiment, the planar layer is dimensioned and is formed of a material so that the at least one conductive electrode is stiff along the input axis. The planar layer may be a metallized planar layer.

The at least one conductive electrode may include a plurality of stiffeners extending from the planar layer along the input axis to stiffen the at least one conductive electrode. In a preferred embodiment, the stiffeners extend either away from or towards the proofmass from the planar layer. The proofmass includes a plurality of cavities when the stiffeners extend toward the proofmass. In this embodiment, the stiffeners are received within the cavities and the stiffeners and the proofmass have the substantially uniform narrow air gap therebetween.

The planar layer and the stiffeners may be formed of different materials or different forms of the same material such as a silicon semiconductor material.

The planar layer and the proofmass may be formed of different materials or different forms of the same material.

Further in carrying out the above objects and other objects of the present invention, a microelectromechanical capacitive accelerometer having an input axis is provided. The accelerometer includes a pair of spaced conductive electrodes. Each of the conductive electrodes includes a planar layer which is relatively thin along the input axis but is stiff to resist bending movement along the input axis. The accelerometer also includes a proofmass which is thicker than each of the planar layers by at least one order of magnitude along the input axis and a support structure for supporting the proofmass between the conductive electrodes. The conductive electrodes and the proofmass form a pair of substantially uniform narrow air gaps on opposite sides of the proofmass. The pair of conductive electrodes and the proofmass form a pair of acceleration-sensitive capacitors.

Preferably, both of the conductive electrodes are sufficiently stiff to force-balance proof-mass displacement due to acceleration along the input axis without substantial bending of the conductive electrodes along the input axis.

Also, preferably, the support structure includes a plurality of conductive beams for suspending the proofmass between the conductive electrodes.

Still, preferably, each of the planar layers of the conductive electrodes has a plurality of damping holes formed completely therethrough to reduce damping factor.

In a preferred embodiment of the invention, the proofmass is formed from a single silicon wafer having a predetermined thickness and wherein the thickness of the proofmass is substantially equal to the predetermined thickness.

In one embodiment, the planar layer is dimensioned and is formed of a material so that the at least one conductive electrode is stiff along the input axis.

Each of the planar layers may be a metallized planar layer.

Each conductive electrode may include a plurality of stiffeners extending from its planar layer along the input axis to stiffen their respective conductive electrode. The stiffeners may extend either towards or away from the proofmass from their respective planar layer. When the stiffeners extend toward the proofmass, the proofmass includes a plurality of cavities on opposite sides thereof and the stiffeners are received within the cavities. In this embodiment, the stiffeners and the proofmass have the substantially uniform narrow air gaps therebetween.

The planar layers and the stiffeners may be formed of different materials or different forms of the same material such as a silicon semiconductor material.

The planar layers and the proofmass may be formed of different materials or different forms of the same material.

Yet still further in carrying out the above objects and other objects of the present invention, in a method for making a microelectromechanical capacitive accelerometer having a proofmass with a thickness along an input axis of the accelerometer and at least one conductive electrode from a single semiconductor wafer having a predetermined thickness, an improvement is provided. The improvement includes the steps of depositing a planar layer which is relatively thin along the input axis on the wafer and stiffening the planar layer to form the at least one conductive electrode which is stiff so as to resist bending movement along the input axis. The method also includes the step of forming a substantially uniform narrow gap between the at least one conductive electrode and the proofmass wherein the thickness of the proofmass is at least one order of magnitude greater than the thickness of the planar layer.

Preferably, the thickness of the proofmass is substantially equal to the predetermined thickness.

In one embodiment, the semiconductor wafer is a silicon wafer.

The accelerometer of the present invention preferably utilizes stiffened thin film sense/feedback electrodes and the method of the present invention is provided to overcome the challenges of high precision capacitive accelerometer design. These challenges are achieving a large proofmass, controllable and low damping factor, and large capacitance variation—all by the same design. The accelerometer has the following features: high resolution, large sensitivity, small damping without vacuum packaging, and low cross-axis sensitivity. Also, it has low temperature sensitivity and good long term stability as it is all silicon in one embodiment and made in a single wafer process. The manufacturing method of the invention provides batch fabrication at low cost and with high yield.

Several significant innovative features of the accelerometer structure and its manufacturing technique are: 1) forming the top and bottom sense/feedback electrodes with embedded damping holes using stiffened deposited polysilicon layers; 2) forming a thick proofmass by etching bulk of a single silicon wafer; 3) forming a uniform narrow gap over a large area by etching a sacrificial layer; and 4) using a single silicon wafer for manufacturing without any need for wafer bonding.

The microaccelerometer preferably includes a silicon-wafer thick proofmass suspended with conductive beams between two conductive electrodes on top and bottom. The electrodes and the proofmass are separated by a narrow air gap and form two acceleration sensitive capacitors on top and bottom. The electrodes are made stiff to be able to force rebalance the proofmass displacement due to external acceleration and operate the sensor in closed-loop. These electrodes have embedded damping holes to control the damping factor and effectively reduce the device noise floor at atmospheric ambient pressure—without any need for vacuum packaging.

In one embodiment, the electrodes are formed by thin polysilicon film deposition. There are vertical stiffeners embedded in the electrodes to make them stiff in the sense direction. The vertical stiffeners are made by complete refilling of the vertical trenches etched in the proofmass. A thin sacrificial silicon oxide layer separates the proofmass from the electrodes and will be etched away after proofmass formation in silicon etchant. The conductive suspension beams are formed by shallow p++ diffusion or polysilicon. The p++ beams are not etched in the silicon etchant during the proofmass formation and release. The polysilicon beams are protected by a thin silicon oxide layer, similar to the polysilicon electrodes.

The sensor typically is operated in a closed-loop mode. Preferably, a switched-capacitor sigma-delta modulator circuit is utilized to force-rebalance the proofmass and provide direct digital output for the accelerometer.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 6 is a schematic, perspective view, in cross-section, of a second embodiment of an accelerometer also constructed in accordance with the present invention and also with the thickness of the electrodes greatly exaggerated;

FIG. 7 is a sectional view of the accelerometer of FIG. 6 taken along lines 7—7;

FIG. 8 is a top plan view of the second embodiment of an accelerometer constructed in accordance with the present invention with the upper electrode formed as three pieces;

BEST MODE FOR CARRYING OUT THE INVENTION

Figure 1:
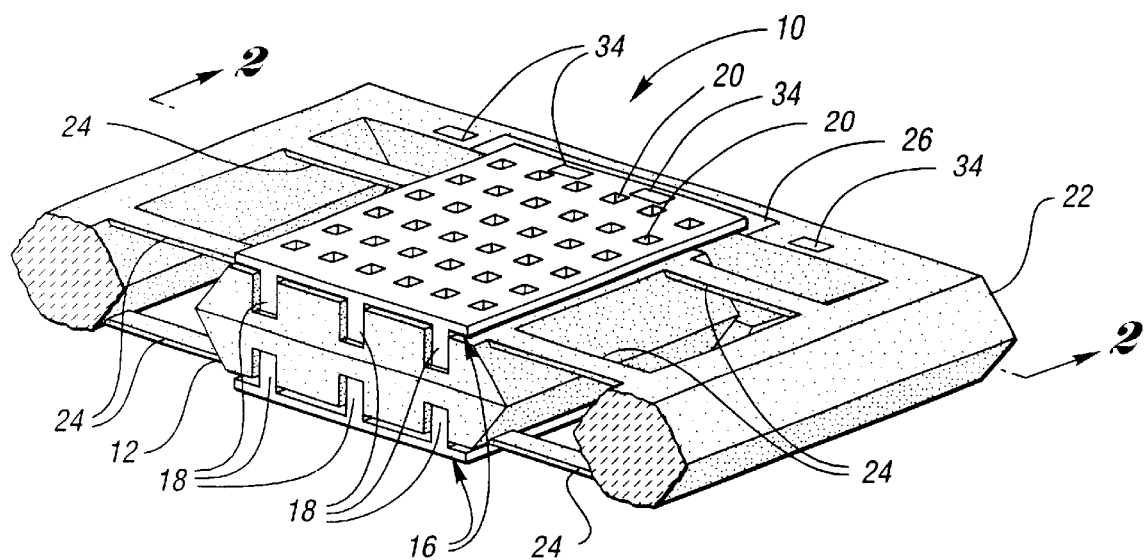
FIG. 1 is a schematic, perspective view, in cross-section, of an accelerometer constructed in accordance with one embodiment of the present invention with the thicknesses of the electrodes greatly exaggerated for illustrative purposes.
Figure 2:
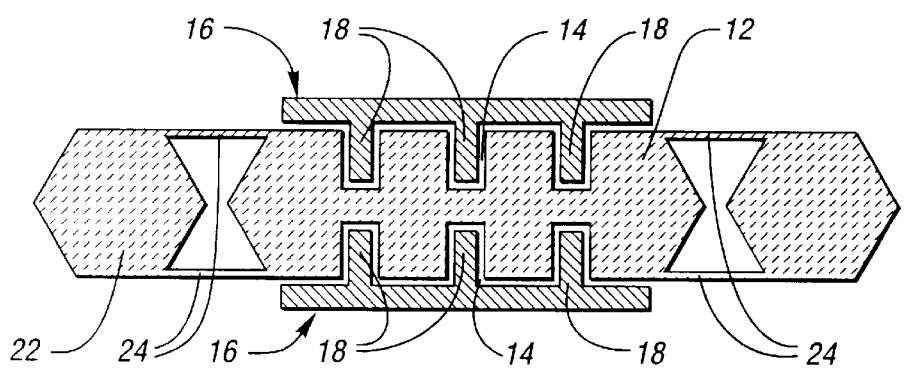
FIG. 2 is a sectional view of the accelerometer of FIG. 1 taken along line 2—2.
Figure 3:
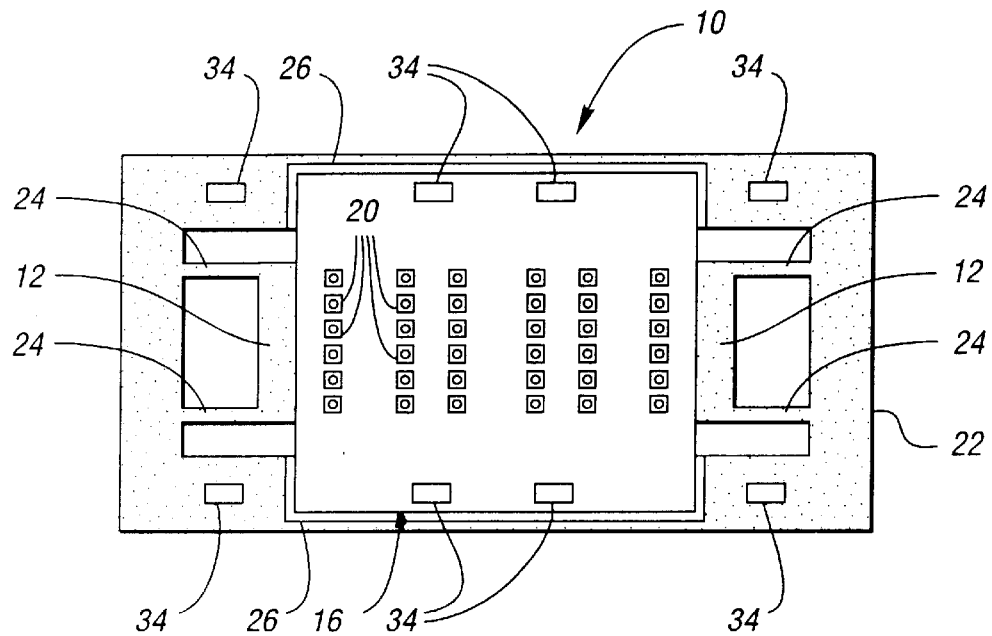
FIG. 3 is a top plan view of the accelerometer of FIG. 1.

In general, an accelerometer 10 of FIGS. 1–4 and its manufacturing technology address all high precision accelerometer design issues. The method of the present invention combines both surface and bulk micromachining in order to achieve high device sensitivity, low noise floor, and controllable damping—all by using a single silicon wafer. The central idea of the present invention is to use the whole wafer thickness to attain a large silicon proofmass 12 (i.e. typically about 450 microns thick for a four inch silicon wafer) together with at least one stiffened conductive electrode of the accelerometer 10. The at least one stiffened conductive electrode may comprise a plurality of electrically isolated conductive electrodes.

In a first embodiment of the invention, a sacrificial thin film is utilized to form uniform and conformal gaps 14 over a large area. Polysilicon electrodes, generally indicated at 16, are created by depositing polysilicon on a wafer 17 (i.e. FIG. 5a). These electrodes 16, while thin (i.e. typically 2 microns), are made very stiff by embedding thick (i.e. typically 20–30 microns) vertical stiffeners 18 in them so that force rebalancing of the thick proofmass 12 becomes possible.

A first embodiment of the method of the invention utilizes a trench refill technique to form the thick stiffeners 18 by depositing thin polysilicon films. Configuration and geometry of damping holes 20 can be easily formed on the polysilicon electrodes 16 to optimize the damping coefficient and capacitance, while there is no concern with large hole density and its effect on electrode softening as the electrode stiffness is mainly provided by the embedded stiffeners 18.

The proofmass 12 and its supporting rim or frame 22 have a thickness along a sense or input axis essentially equal to the whole wafer thickness and are formed by etching the bulk of the silicon wafer 17 (i.e. FIGS. 5a–5e) (i.e. bulk micromachining). There are eight suspension beams 24 of the support structure which are symmetric with respect to the proofmass centerline and result in low cross-axis sensitivity. Obviously, other suspension beam configurations may be used.

These suspension beams 24 are formed by heavily boron-doped strips of the silicon wafer or deposited polysilicon layer. The electrodes 16 are polysilicon plates or layers deposited on both sides of the proofmass 12 and anchored on an isolation dielectric 26 in the frame 22.

The device 10 has low temperature sensitivity as the expansion coefficients of the poly electrodes 16 and silicon frame 22 match each other closely. Furthermore, the accelerometer 10 has a good long term stability as it is all-silicon and uses no wafer bonding in its manufacturing process.

Figure 4:
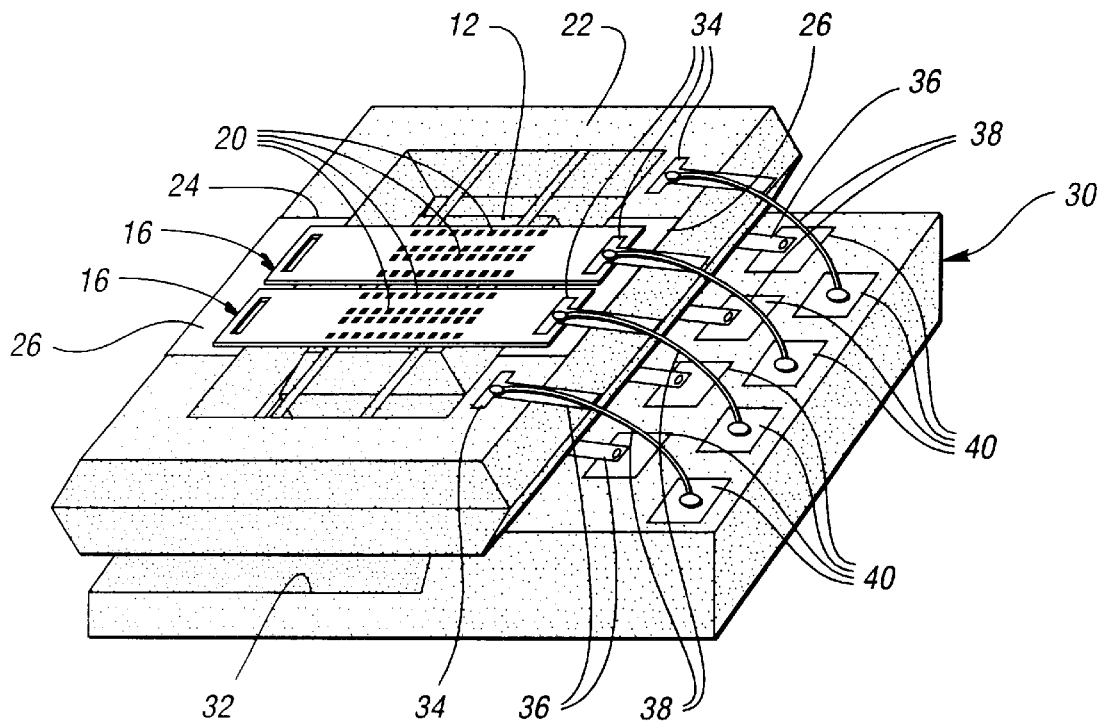
FIG. 4 is a perspective view of the accelerometer of FIG. 1 mounted on a base and with the upper electrode formed as two pieces.

After completion of fabrication, the microaccelerometer 10 is typically mounted on one edge of its frame 22 on a recessed substrate 30 and is suspended over a recessed area 32 thereof as shown in FIG. 4. The electrode 16 in FIG. 4 is illustrated as two pieces for satisfying different needs such as self-testing and self-calibration. In this manner, package and mounting induced stresses will be reduced and not affect device performance. The accelerometer 10 has bonding pads 34 on upper and lower sides to make the accelerometer 10 symmetric. Each pad 34 at the bottom has a thick (i.e. 4–5 $\mu$m) electroplated metal overhang 36 over the frame 22 which is directly bonded to pads 40 on the mounting substrate 30 using an ultrasonic wirebonder. Access to the top pads 34 is provided by wirebonds 38. The pads 34 on the top have metal overhangs 36 too, since the same metal mask is used to process both sides. However, the top metal pads 34 are not required to be thick.

Manufacturing Method

Figure 5A:
FIGS. 5a–5e are side views illustrating a sequence of fabrication steps to obtain the accelerometer of FIG. 1.

The accelerometer fabrication process of the first embodiment typically requires eight masks, and is performed symmetrically on both sides of the wafer, as shown in FIGS. 5a–5e. The process starts with a shallow (i.e. 3 $\mu$m) p++ boron diffusion on <100> double-polished p-type Si wafer, using thermal oxide as a mask, as illustrated in FIG. 5a. Both sides of the wafer are patterned and the patterns are aligned to each other. Shallow boron diffusion may be performed to define the beams 24, the proofmass 12 and the supporting rim 22. obviously, other ways are also possible to define these structures.

Then, a thin layer of LPCVD silicon nitride is deposited and patterned to form the polysilicon electrode anchors and isolation dielectric 26 under the polysilicon electrode dimples.

Figure 5B:
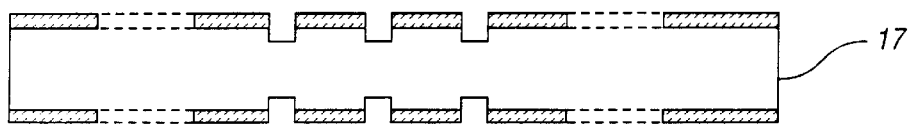

The next masking step is etching narrow, deep trenches with an aspect ratio having a range of 4–12 to define the vertical electrode stiffeners 18, as illustrated in FIG. 5b. The deep trench etch is performed by an anisotropic dry etcher.

Figure 5C:
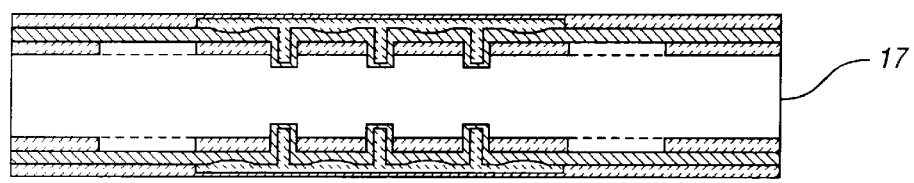

As illustrated in FIG. 5c, the trenches are then refilled completely using a sacrificial LPCVD silicon oxide and a LPCVD polysilicon layer. The polysilicon is etched back using a blanket RIE etch, exposing the sacrificial silicon oxide and leaving polysilicon plugs in the trenches. In this manner, the step height due to the trench etch is reduced and the sacrificial silicon oxide at the bottom of the trenches is protected.

Next, two patterning steps are performed on the sacrificial silicon oxide. First, it is patterned and partially wet-etched to form dimples inside the polysilicon electrodes 16. These dimples reduce the contact area and help reduce stiction. Second, narrow strips of sacrificial silicon oxide are patterned and etched away at the anchors. Sacrificial silicon oxide is left in most areas of the anchors to reduce the parasitics and is sealed between underneath the silicon nitride and the top polysilicon.

A LPCVD polysilicon layer is then deposited to connect to the polysilicon plugs in the trenches and form the electrodes 16. Each polysilicon electrode 16 is doped with phosphorus or boron. The electrodes 16 are sealed with a thin LPCVD silicon oxide layer in the next step.

Figure 5D:
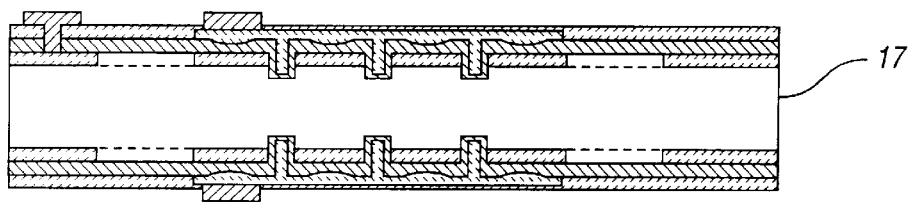

As indicated in FIG. 5d, this oxide is patterned to form metal contacts and openings to bulk Si for the subsequent proofmass release. The wafer is then patterned for Cr/Au thin film deposition and lift-off.

Figure 5E:
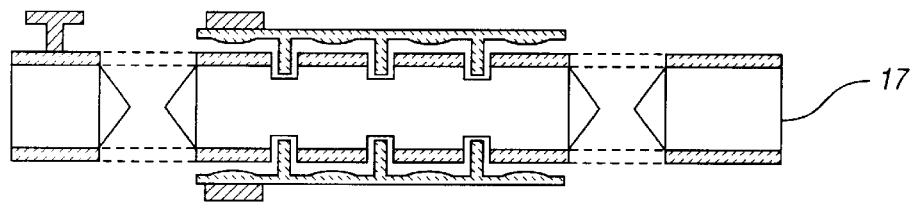

As indicated in FIG. 5e, the proofmass is released by etching the bulk of silicon using a wet, dry or a combination of wet and dry etch and subsequent sacrificial silicon oxide etch. The released structures may be coated with Self-Assembled Monolayer (SAM) and dried in an oven (i.e. to make the polysilicon and silicon surfaces hydrophobic and help to avoid stiction).

Referring now to FIGS. 6 and 7, there is illustrated another embodiment of a fully symmetrical accelerometer, generally indicated at 50, constructed in accordance with many of the process steps of the first embodiment of the present invention. However, in this embodiment, the accelerometer 50 has electroplated metal sense/feedback electrodes 52 rather than polysilicon electrodes. Similar to the first embodiment, the accelerometer 50 includes a silicon proofmass 54 and suspension beams 56. Air gaps 58 separate the electrodes 52 from the proofmass 54. The beams 56 and a silicon frame 60 define a support structure for the proofmass 54.

The electrodes 52 have damping holes 62 formed completely therethrough. A dielectric 64 is also formed in the frame 60 as in the first embodiment.

The electrodes 52 are made stiff in the sense direction by using a thick (i.e. larger than 3 microns) electroplated layer. The electroplating method of manufacturing allows a thick, stiff plate formation without any need for embedded vertical stiffeners. Moreover, the electroplating fabrication process is performed at a low temperature and is compatible to be a post-process for microelectronic circuitry. Hence, full-monolithic, high sensitivity microaccelerometers with interface circuitry can be manufactured at low cost and large volume.

FIG. 8 shows a different form of the second embodiment of a fully symmetrical accelerometer, generally indicated at 70, also constructed in accordance with many of the process steps of the first embodiment of the present invention. However, in this embodiment, the accelerometer 70 includes a plurality of electroplated electrodes 72 (i.e. three to provide the capability for such features as self-test and self-calibration) with damping holes 74 formed completely therethrough. The accelerometer 70 also includes a silicon support rim 74, support beams 76, a silicon proofmass 78, metal bonding pads 80, and isolation dielectrics 82.

Figure 9:
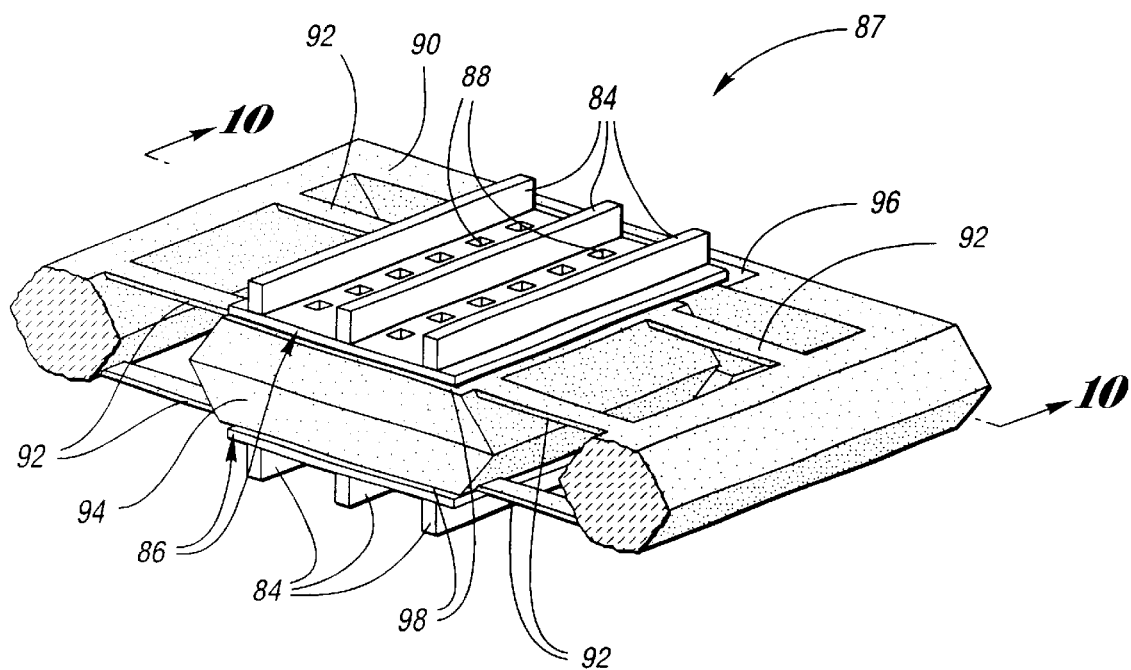
FIG. 9 is a schematic perspective view in cross-section of a fully symmetrical accelerometer constructed in accordance with another embodiment of the present invention.
Figure 10:
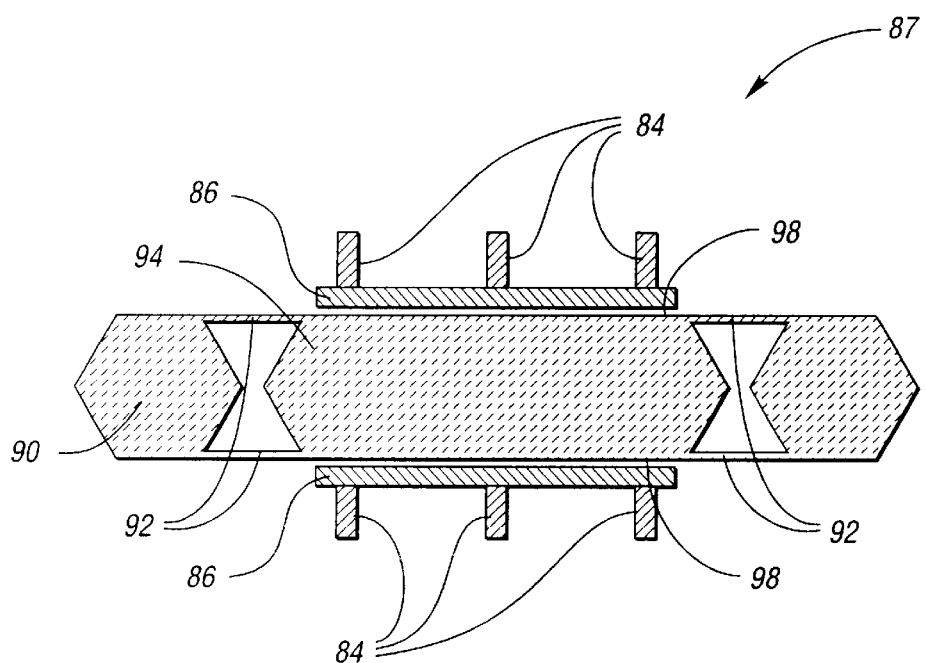
FIG. 10 is a sectional view of the accelerometer of FIG. 9 taken along lines 10—10.

Other ways are also possible for stiffening the electrodes of an accelerometer of the present invention. For example, as illustrated in FIGS. 9 and 10, ribs 84 may be formed on the outer exterior surfaces of spaced polysilicon layers to form electrodes 86 of an accelerometer, generally indicated at 87. In this way, the exterior ribs 84 are formed rather than interior ribs 18 as provided by the first embodiment of the present invention.

The embodiment of FIGS. 9 and 10 is constructed with many of the same process steps of the first embodiment. The electrodes 86 have damping holes 88 formed completely therethrough. The accelerometer 87 also includes a silicon support rim 90, support beams 92, a silicon proofmass 94, an isolation dielectric 96 and air gaps 98 between the proofmass 94 and the electrodes 86.

While the best modes for carrying out the invention have been described in detail, those familiar with the art to which this invention relates will recognize various alternative designs and embodiments for practicing the invention as defined by the following claims.

What is claimed is:

1. In a method for making a microelectromechanical capacitive accelerometer having a proofmass with a thickness along an input axis of the accelerometer and at least one conductive electrode from a single semiconductor wafer having a predetermined thickness, the improvement comprising:

depositing a planar layer on the wafer which is relatively thin along the input axis;

stiffening the planar layer to form the at least one conductive electrode which is stiff so as to resist bending movement along the input axis; and forming a substantially uniform narrow gap between the at least one conductive electrode and the proofmass wherein the thickness of the proofmass is at least one order of magnitude greater than the thickness of the planar layer, and wherein the thickness of the proofmass is substantially equal to the predetermined thickness of the wafer.

2. The method as claimed in claim 1 wherein the semiconductor wafer is a silicon wafer.

3. The method as claimed in claim 1 wherein the step of stiffening the planar layer includes the step of forming a metallic layer on the planar layer.

4. The method as claimed in claim 1 wherein the step of stiffening includes the step of forming stiffening ribs on the planar layer.

5. The method as claimed in claim 4 wherein the step of forming the stiffening ribs includes the steps of forming trenches in the proofmass and refilling the trenches with a sacrificial layer having a substantially uniform thickness and an electrode material and wherein the step of forming the substantially uniform narrow air gap includes the step of removing the sacrificial layer.

* * * * *

UNITED STATES PATENT AND TRADEMARK OFFICE
CERTIFICATE OF CORRECTION

PATENT NO.    : 6,402,968 B1
DATED         : June 11, 2002
INVENTOR(S)   : Navid Yazdi et al.

It is certified that error appears in the above-identified patent and that said Letters Patent is hereby corrected as shown below:

<u>Title page,</u>
Title, after "MICROELECTROMECHANICAL" delete "CAPACTIVE" and replace with -- CAPACITIVE --.

Signed and Sealed this

Third Day of September, 2002

*Attest:*

*Attesting Officer*

JAMES E. ROGAN
*Director of the United States Patent and Trademark Office*